United States Patent [19]
Middleton

[11] Patent Number: 5,538,646
[45] Date of Patent: Jul. 23, 1996

[54] METHOD AND SYSTEM FOR REMOVING OIL FROM OIL-ABSORBENT MATERIAL

[76] Inventor: Richard Middleton, 423 Autumn Cir., Columbia, S.C. 29206

[21] Appl. No.: 376,014

[22] Filed: Jan. 20, 1995

[51] Int. Cl.⁶ .................................................. B01D 12/00
[52] U.S. Cl. ......................... 210/671; 134/10; 134/40; 210/259; 210/776; 210/787; 210/806
[58] Field of Search ........................... 134/10, 22.19, 134/13, 33, 40; 210/201, 202, 257.1, 258, 259, 512.1, 513, 770, 787, 800, 801, 804, 806, 908, 909, 639, 634, 671, 776

[56] References Cited

U.S. PATENT DOCUMENTS

| | | |
|---|---|---|
| 3,566,892 | 3/1971 | Logue et al. |
| 4,314,856 | 2/1982 | Steimel ........................... 134/25.4 |
| 5,005,655 | 4/1991 | Stokke et al. ...................... 134/40 |
| 5,192,455 | 3/1993 | Marcel, Jr. ........................ 210/787 |
| 5,244,566 | 9/1993 | Bond ................................. 208/180 |
| 5,250,197 | 10/1993 | Marcel ............................ 210/787 |
| 5,298,079 | 3/1994 | Guymon .......................... 134/16 |

FOREIGN PATENT DOCUMENTS

| | | | |
|---|---|---|---|
| 75241 | 3/1983 | European Pat. Off. ............... | 210/671 |
| 91/13232 | 9/1991 | WIPO ....................................... | 134/40 |

Primary Examiner—Joseph W. Drodge
Attorney, Agent, or Firm—Michael A. Mann

[57] ABSTRACT

A method and system for removing oil from an oil absorbent material. The method comprises placing untreated oil containing material in a centrifuge, centrifuging the material to remove and recover a quantity of pure oil, soaking the material in a low-pH organic degreaser, centrifuging the material a second time to remove the remaining oil and the degreasing solution, separating, skimming and recovering the oil from the degreasing solution, and thereafter disposing the degreasing solution and drying the material. The present invention provides a method of maximizing the recovery of oil, which in turn allows the desorbed material to be recycled or reused and generates a waste degreasing solution that can released directly into a sewage system, thereby minimizing the environmental impact and cost of cleaning the oil absorbent material.

20 Claims, 1 Drawing Sheet

METHOD AND SYSTEM FOR REMOVING OIL FROM OIL-ABSORBENT MATERIAL

BACKGROUND OF THE INVENTION

1. Field of the Invention:

The present invention relates to a method for removing oil from a material. In particular, the present invention is a novel method which recoverably removes oil from a material and allows the material to be reused.

2. Discussion of Background:

The desorption of oil from oil absorbent materials is a prevalent industrial process. As a result, the current art contains a variety of different methods by which oil is removed from a material. What follows is a brief overview of the art's current state.

U.S. Pat. No. 5,298,079 issued to Guymon sets forth a method wherein oil filters are crushed while being simultaneously washed with a surfactant. The crushed oil filters are then reprocessed into steel.

U.S. Pat. No. 5,192,455, issued to Marcel, Jr. and U.S. Pat. No. 5,250,197, issued to Marcel, both disclose a system for removal which includes subjecting the oil containing material to squeeze rollers, a solvent shower, and a centrifuge. Thereafter the material is dried to restore it to a reusable condition.

U.S. Pat. No. 5,244,566 issued to Bond, teaches a special emulsion of citric oil-in-water that causes the waste oil to separate into three layers: an oil. layer, an emulsion layer and a waste layer.

U.S. Pat. No. 4,314,856 issued to Steimel Sets forth a process where an object is degreased, washed and dried in one location. This is accomplished by tilting the axis of rotation of a centrifuge and by operating the centrifuge at different speeds.

U.S. Pat. No. 3,566,892 issued to Logue teaches a device for use in cleaning oil filters. The device contains means by which various sized filters may be cleansed.

However, there remains a need for a oil removal process that is simple, effective and allows the recovery of the oil as well as the restoration of the material to a usable state.

SUMMARY OF THE INVENTION

According to its major aspects and broadly stated, the present invention is a method for removing oil from a material. The method comprises the steps of placing the untreated oil containing material in a centrifuge, and centrifuging the material to thereby remove a quantity of pure oil. This recovered pure oil is processed further while the material is soaked in a mixture of water and degreaser in order to expedite the removal of oil still absorbed in the material. The material is again centrifuged in order to remove an effluent composed of degreasing solution and the remaining oil. The effluent is transported to a separator and allowed to separate, while the desorbed material is dried and subsequently reused. Once the degreasing solution separates from the oil, a skimmer is used to remove the oil from the top of the effluent. The oil that has been skimmed from the separator is further processed, while the degreasing mixture is fowarded to a holding tank, or placed directly into a sewage system.

Centrifuging untreated oil containing materials is a major feature of the present invention. Desorbing the material of oil prior to treatment with chemical agents such as degreasers or detergents allows the recovery of pure oil. The recovery of pure oil reduces the amount of additional processing that must be undertaken before the oil is in a commercially reusable form. Thus, the cost of removing oil from absorbent materials is reduced. In addition, the deleterious chemical by-products produced by the treatment of oil are also eliminated, thereby lessening the environmental impact.

Soaking the material in a mixture of water and degreaser and subsequently centrifuging the material is another important feature of the present invention. The degreaser acts to reduce the interfacial tension between the remaining oil and the fibers of the material. Reduction of this tension makes oil more susceptible to removal by the subsequent centrifugal force. This susceptibility is in turn results in the recovery of additional oil as well as a desorbed material that can be reused.

Separating the oil from the degreasing solution and subsequently skimming the oil from the effluent is still another feature of the present invention. Skimming the oil from the top of the separated effluent yields still more oil that can be commercially exploited. Moreover, the remaining degreasing solution is free from environmentally hazardous agents and can be released into a municipal sewage system without having to undergo additional chemical treatments.

The combination of the initial centrifuging step and the use of an organic degreaser to remove the remainder of the oil is an important feature of the present invention. The initial centrifuging step removes most of the oil in a form where it can be processed for further use. The use of the organic degreaser to remove the small amount of remaining oil assures that the waste water left after skimming the effluent from the second centrifuging step can be disposed of in an ordinary sewer system. Therefore, the cost of disposal of the effluent and is minimal and the value of the recovered oil is maximized. The net results is that the cost and environmental impact of cleaning and recycling the material is minimal.

Other features and advantages of the present invention will be apparent to those skilled in the art from a careful reading of the Detailed Description of a Preferred Embodiment presented below.

DETAILED DESCRIPTION OF A PREFERRED EMBODIMENT

The present invention is a method for removing oil from a material. The method enables the recovery of a substantial amount of pure oil. In addition, the method yields a material that is substantially desorbed of oil, thereby allowing it to be reused. The method disclosed herein is capable of removing oil from most any type of absorbent material; for example, automotive oil filters or industrial oil cloths; however, the method is particularly well suited for removing oil from oil absorbent pads. These pads are made of needle-punched polypropylene and find wide industrial application for absorbing oil in manufacturing settings. These pads can be cleaned and are cleaned for reuse currently; however, heretofore, the process for doing so creates its own waste that has an economic and environmental cost associated with its proper disposal. The present method not only cleans the pads, but does so in such a way that a maximum amount of oil is desorbed from the pads, and the effluent from washing them can be released directly to normal sewage system.

Figure 1:
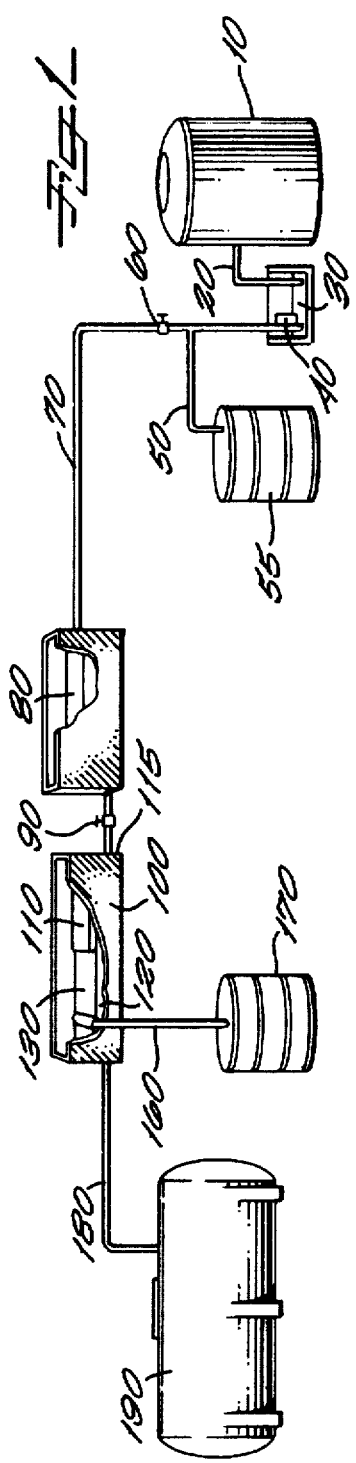
FIG. 1 is a flow chart of a method for removing oil from a material according to a preferred embodiment of the present invention.
Figure 2:
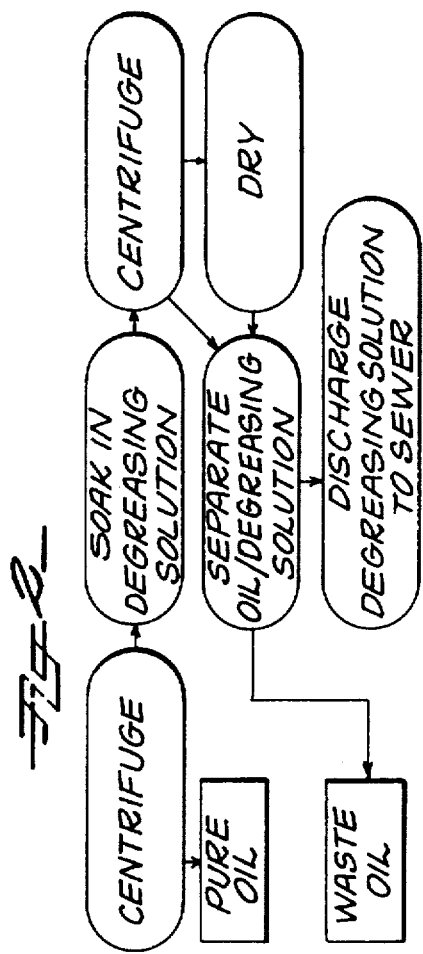
FIG. 2 is a schematic view of a system for removing oil from a material according to the method of FIG. 1.

Referring now to FIG. 1 and FIG. 2, there is shown a flow chart of a method for removing oil from a material according to a preferred embodiment of the present invention and a system for accomplishing the method described in FIG. 1, respectively. The first step in oil desorbtion method is to load the untreated oil contaminated material into a commercial centrifuge 10. Hereinafter, the term "untreated oil contaminated material" means material having oil absorbed therein, but containing negligible amounts of other contaminants, solvents or cleansing solutions. Optionally, the material is allowed to settle in the centrifuge, thereby allowing a portion of the oil to drain by gravity to the bottom of centrifuge 10. Alternatively, an apparatus, incorporated herein by reference, which utilizes the gravitational effect to desorb a material of oil is disclosed in co-pending application entitled, "Apparatus For Supporting and Facilitating Drainage of an Absorbant Material", and can be used to accomplish this preliminary desorbtion.

The contaminated material is then centrifuged at a rate of speed sufficient to impart a force in excess of 1000 times the acceleration of gravity, or 1000 "G"s. This force is necessary in order to maximize the recovery of pure oil from the absorbed material. As used herein, the term "pure oil" means oil that is uncontaminated by chemical agents normally employed to expedite the removal of oil from an absorbent material.

Centrifuging should continue until approximately 90% of oil contained in the material is desorbed. The recovered pure oil is removed from the centrifuge via piping 20 and enters a receptacle 30. Thereafter a pump 40 forwards the removed oil through piping 50 to an oil drum 55 to await further processing.

The oil contaminated material is then soaked in a solution of water and a degreaser. The degreasing solution may be placed directly into centrifuge 10, or the contaminated material may be removed from the centrifuge and transported to a suitable vessel which contains the degreasing solution (not shown). Preferably, the volumetric ratio of water to degreaser is approximately 20 to 1. The quantity of solution used will vary depending upon the amount of material placed in the centrifuge, but must be sufficient to fully saturate the oil contaminated material. Additionally, the soaking time required is dependent upon the specific degreaser employed, the degree of contamination, and the amount of material to be desorbed and must therefore be determined by a modest degree of experimentation.

Any degreaser commonly employed in the desorbtion of oil can be used with the present method. However, when desorbing polypropylene pads, an organic, low-pH degreaser (at or below a pH of 9) such as that manufactured by Buckeye International, Inc. and sold under the trademark SHOPMASTER LPH, is preferred.

Thereafter, the contaminated material is again centrifuged to desorb both the remaining oil and the water/degreasing solution. The time required to complete this step is based upon the type and quantity of material being desorbed as well as the specific residual oil values tolerated by the particular application.

The resulting effluent of oil and water/degreasing solution enters receptacle 40. A valve 60 located in piping 70 is then opened, and pump 40 activated to transport the effluent to a surge tank 80. The effluent contained in surge tank 80 is controllably released through a valve 90 into a separator 100. The effluent contained in separator 100 is allowed to settle and subsequently separate into a degreaser/water phase 120 and an oil phase 130. A grid 110, positioned at entrance 115 of separator 100 is immersed in oil phase 130 and serves to prevent turbulence in oil phase 130 caused by the introduction of effluent from surge tank 100.

Figure 3:
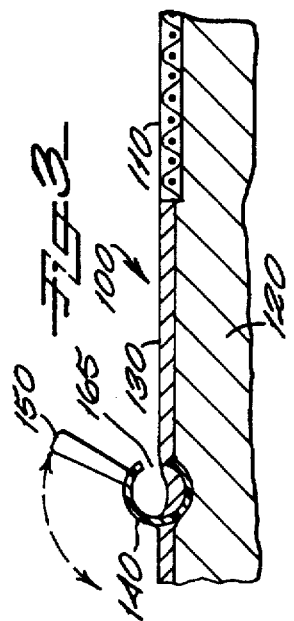
FIG. 3 is a cross-sectional view of a skimmer for removing oil from a separation tank according to the method of FIG. 1.

Referring now to FIG. 3, there is shown a cross-sectional view of the effluent contained in separator 100. Sufficient separation is achieved when oil phase 130 resides on the top of the water/degreaser phase 120 due to differences in specific gravity. At such time, oil phase 130 is removed from degreaser/water phase 120.

Removal of oil phase 130 may be accomplished by any means commonly employed in the art, such as filtration or decantation. Preferably, a skimmer 140 is used to remove oil phase 130 from separator 100. Skimmer 140 is an annular pipe placed horizontally within oil phase 130. When separation is complete, a handle 150 is rotated to bring an aperture 160, formed horizontally in skimmer 140, in registration with oil phase 130 so that oil phase 130 flows into aperture 165. The oil entering skimmer 140 is then moved through a pipe 160 and enters an oil drum 170.

The degreaser/water phase 120 contained in separator 100 is forwarded through pipe 180 and is deposited in holding tank 190. As a result of this method, the degreaser/water phase 120 contains less than one part per million of residual oil, and therefore can be released into a sewage system without further decontamination treatments.

The desorbed material contained in centrifuge 10 is thereafter removed and allowed to dry. Drying the oil desorbed material can be augmented by any method known to those skilled in the art including, but not limited to, tumble drying, and blow drying.

It will be apparent to those skilled in the art that many changes and substitutions can be made to the preferred embodiment herein described without departing from the spirit and scope of the present invention as defined by the appended claims.

What is claimed is:

1. A method for removing oil from oil-absorbent material, said method comprising the steps of:

removing a first quantity of said oil from said material;

soaking said material in a degreasing solution;

removing a second quantity of said oil and said degreasing solution from said material;

separating said second quantity of said oil from said degreasing solution and skimming said second quantity of said oil from said degreasing solution.

2. The method as recited in claim 1, wherein said step of removing a first quantity of said oil is achieved by centrifuging said material.

3. The method as recited in claim 1, wherein said step of removing a first quantity of said oil is achieved by centrifuging at a speed sufficient to impart a force in excess of 1000 Gs.

4. The method as recited in claim 1, wherein said step of removing a second quantity of said oil and said degreasing solution comprises centrifuging said material.

5. The method as recited in claim 1 wherein said degreasing solution contains water and a low-pH, organic degreaser, in a volumetric ratio of 20 to 1.

6. The method as recited in claim 1, further comprising the step of recovering said first quantity of said oil.

7. The method as recited in claim 1, further comprising the step of recovering said second quantity of said oil.

8. The method as recited in claim 1, further comprising the step of drying said material after said second quantity of said oil and said degreasing solution is removed from said material.

9. A method for removing oil from oil-absorbent material, said method comprising the steps of:

removing a first quantity of said oil from said material;

recovering said first quantity of said oil;

soaking said material in a degreasing solution;

removing a second quantity of said oil and said degreasing solution from said material;

separating said second quantity of said oil from said degreasing solution;

skimming said second quantity of said oil from said degreasing solution; and drying said material after said second quantity of said oil and said degreasing solution is removed from said material.

10. The method as recited in claim 9, wherein said step of removing a first quantity of said oil is achieved by centrifuging said material.

11. The method as recited in claim 9, wherein said step of removing a first quantity of said oil is achieved by centrifuging said material at a speed sufficient to impart a force in excess of 1000 Cs.

12. The method as recited in claim 9, wherein said step of removing a second quantity of said oil and said degreasing solution comprises centrifuging said material.

13. The method as recited in claim 9, wherein said degreasing solution contains water and a low-pH, organic degreaser in a volumetric ratio of 20 to 1.

14. The method as recited in claim 9, further comprising the step of recovering said second quantity of said oil.

15. A system for removing oil from oil-absorbent material, said system comprising:

means for removing a first quantity of oil and an effluent from said material, said effluent containing a second quantity of oil and a degreasing solution;

means for separating said effluent into said second quantity of oil and said degreasing solution, said separating means in operational connection with said removing means;

means for skimming said second quantity of oil from said degreasing solution, said skimming means in operational connection with said separating means;

a first oil drum in operational connection with said removing means, said first oil drum storing said first quantity of oil;

a second oil drum in operational connection with said skimming means, said second oil dram storing said second quantity of oil; and a pump in operational connection with said removing means, said pump pumping said first quantity of oil to said first oil drum, said pump pumping said effluent to said separating means.

16. The system as recited in claim 15, wherein said removing means comprises a centrifuge.

17. The system as recited in claim 15, wherein said separating means further comprises:

a surge tank, said surge tank in operational connection with said pump, said surge tank holding a quantity of said effluent;

means for controllably releasing said effluent from said surge tank; and a separator in operational connection with said releasing means, said separator separating said second quantity of oil from said degreasing solution.

18. The system as recited in claim 15, further comprising a holding tank in operational connection with said separating means, said holding tank receiving said degreasing solution from said separating means.

19. The system as recited in claim 15, further comprising means in operational connection with said separating means for releasing said degreasing solution into a sewage system.

20. The system as recited in claim 15, wherein said separating means further comprises;

a surge tank, said surge tank in operational connection with said pump, said surge tank holding a quantity of said effluent, means for controllably releasing said effluent from said surge tank, a separator in operational connection with said releasing means, said separator separating said second quantity of oil from said degreasing solution, and wherein said skimming means further comprises an annular pipe in operational connection with said second oil drum, said pipe having an aperture formed horizontally therethrough, said pipe positioned horizontally in said second quantity of oil, said second quantity of oil entering said aperture when said second quantity of oil rises to be in registration with said aperture, said second quantity of oil moving from said pipe into said second oil drum.

\* \* \* \* \*